United States Patent
Rabby

[11] Patent Number: 5,979,865
[45] Date of Patent: Nov. 9, 1999

[54] ROTARY VALVE ACTUATOR

[75] Inventor: Glen Irvin Rabby, Sherwood Park, Canada

[73] Assignee: Hi-Kalibre Equipment Ltd., Edmonton, Canada

[21] Appl. No.: 08/633,051

[22] Filed: Apr. 16, 1996

[30] Foreign Application Priority Data

Apr. 28, 1995 [CA] Canada ................................ 2148176

[51] Int. Cl.$^6$ .................................................. F16K 31/143
[52] U.S. Cl. ............................ 251/62; 251/250; 137/315
[58] Field of Search .............................. 251/58, 62, 250; 137/315

[56] References Cited

U.S. PATENT DOCUMENTS

| | | | |
|---|---|---|---|
| 3,104,862 | 9/1963 | Pearson et al. | 251/250 |
| 3,589,667 | 6/1971 | Lewis et al. | 251/250 |
| 3,806,082 | 4/1974 | Kellner | 251/62 |
| 3,941,348 | 3/1976 | Mott | 251/58 |
| 4,700,924 | 10/1987 | Nelson et al. | 251/58 |

*Primary Examiner*—A. Michael Chambers
*Attorney, Agent, or Firm*—Anthony R. Lambert

[57] ABSTRACT

A rotary valve actuator for actuating a valve that must be rotated between an open position and a closed position. The valve is disposed in a tubular valve housing having an exterior surface with at least one actuating member receiving aperture. The rotary valve actuator includes a substantially annular body having an interior surface, an exterior surface and a central axis. A male actuator member is rotatably mounted within the body. The male actuator member has a valve coupling end that projects perpendicularly from the interior surface of the body, such that it can be inserted into the actuating member receiving aperture of the tubular valve housing. A hydraulic chamber is positioned in the body having a first inlet and a second inlet. A fluid responsive member is positioned in the one hydraulic chamber between the first inlet and the second inlet. Hydraulic fluid is selectively supplied to the first inlet, such that the flow of hydraulic fluid through the first inlet into the hydraulic chamber causes the fluid responsive member to move in a first direction. Hydraulic fluid is selectively supplied to the second inlet, such that the flow of hydraulic fluid through the second inlet into the hydraulic chamber causes the fluid responsive member to move in a second direction. The movement of the fluid responsive member is translated into rotary movement of the male actuator member.

4 Claims, 7 Drawing Sheets

ROTARY VALVE ACTUATOR

FIELD OF THE INVENTION

The present invention relates to a rotary valve actuator and, in particular, to a rotary valve actuator suitable for use in operating a kelly valve when drilling oil and gas wells.

BACKGROUND OF THE INVENTION

Rotary valve actuators are used to actuate valves which must be rotated from an open position to a closed position. In any application in which fluids are conveyed through conduit, such rotary valves are positioned in tubular valve housings which are incorporated into the conduit. In such installations, the valve actuators are secured to an exterior surface of the tubular valve housings. The valve actuators have at least one male member which extends through an aperture in the tubular valve housings to engage the valve. The valve is actuated by rotation of the male member. The rotation of the male member, in turn, rotates the valve between the open position and the closed position.

A particularly onerous application for a rotary valve actuator is the operation of a kelly valve on a drilling rig drilling oil and gas wells. In such applications, the valve is subjected to a flow of abrasive and corrosive drilling fluids. The valve is also subjected to jarring impacts which are transmitted from the drilling bit, up the length drill string to the kelly. These harsh conditions lead to inconsistency in operation of the rotary valve actuator. Exposure to such corrosive drilling fluids makes the valve increasingly difficult to rotate between the open position and closed position as drilling procedures continue. Some rotary valve actuators are unable to generate sufficient foot pounds of torque to completely close the valve, as corrosion affects the operation of the valve. Some rotary valve actuators have a tendency to close prematurely when subjected to a jarring impact.

SUMMARY OF THE INVENTION

What is required is a rotary valve actuator that is capable of more consistent operation under harsh conditions in which it is subjected to jarring impacts and the valve it actuates is subjected to abrasive and corrosive fluids.

According to the present invention there is provided a rotary valve actuator for actuating a valve that must be rotated between an open position and a closed position. The valve is disposed in a tubular valve housing having an exterior surface with at least one actuating member receiving aperture. The rotary valve actuator includes a substantially annular body having an interior surface, an exterior surface and a central axis. At least one male actuator member is rotatably mounted within the body. The male member has a valve coupling end that projects perpendicularly from the interior surface of the body, such that it can be inserted into the actuating member receiving aperture of the tubular valve housing. Means is provided for securing the body to the exterior surface of the tubular valve housing. At least one hydraulic chamber is positioned in the body having a first inlet and a second inlet. A fluid responsive member is positioned in the at least one hydraulic chamber between the first inlet and the second inlet. Means is provided for supplying hydraulic fluid to the first inlet, such that the flow of hydraulic fluid through the first inlet into the at least one hydraulic chamber causes the fluid responsive member to move in a first direction. Means is provided for supplying hydraulic fluid to the second inlet, such that the flow of hydraulic fluid through the second inlet into the at least one hydraulic chamber causes the fluid responsive member to move in a second direction. Means is provided for translating movement of the fluid responsive member into rotary movement of the at least one male actuator member.

The use of hydraulics, as described above, has been found to dramatically improve the reliability and consistency of the valve actuator. Hydraulic fluid can generate sufficient force to continue to activate the actuator, notwithstanding increased torque is required due to the adverse affects of corrosion. Hydraulic fluid is not subject to closure due to jarring, as the presence of hydraulic fluid on either side of the fluid responsive member dampens any movement that might otherwise occur due to jarring. The hydraulics can be configured in a variety of ways. For example, the hydraulic chamber can take the form of a cylinder positioned parallel to the central axis of the body with the first inlet being positioned at a first end of the cylinder and the second inlet being positioned at a second end of the cylinder. In such case, the fluid member takes the form of a piston that moves reciprocally between the first end and the second end of the cylinder.

Although beneficial results may be obtained through the use of the valve actuator, as described above, the valve actuator will sustain less damage due to vibration when securely fastened to the exterior surface of the tubular valve housing. Even more beneficial results may, therefore, be obtained when the means for fastening the means for securing the body to the exterior surface of the tubular valve housing includes a first set of four screw clamps and a second set of four screw clamps. The first set of four screw clamps extend substantially perpendicularly from the interior surface of the body spaced from the at least one male actuator member toward a first end of the body. The first set of four screw clamps are in equispaced radial array around the interior surface of the body. The second set of four screw clamps extend substantially perpendicularly from the interior surface of the body spaced from the at least one male actuator member toward a second end of the body. The second set of four screw clamps are in equispaced radial array around the interior surface of the body.

There are various means for translating movement of the fluid responsive piston into rotary movement of the at least one male actuator member. It is preferred that a pinion gear be positioned on the male actuator member. The pinion gear engages a rack tooth profile on an exterior surface of the piston, such that as the piston moves reciprocally between the first end and the second end of the at least one hydraulic cylinder the rack tooth profile engages and causes rotational movement of the pinion gear thereby rotating the at least one male actuator member.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
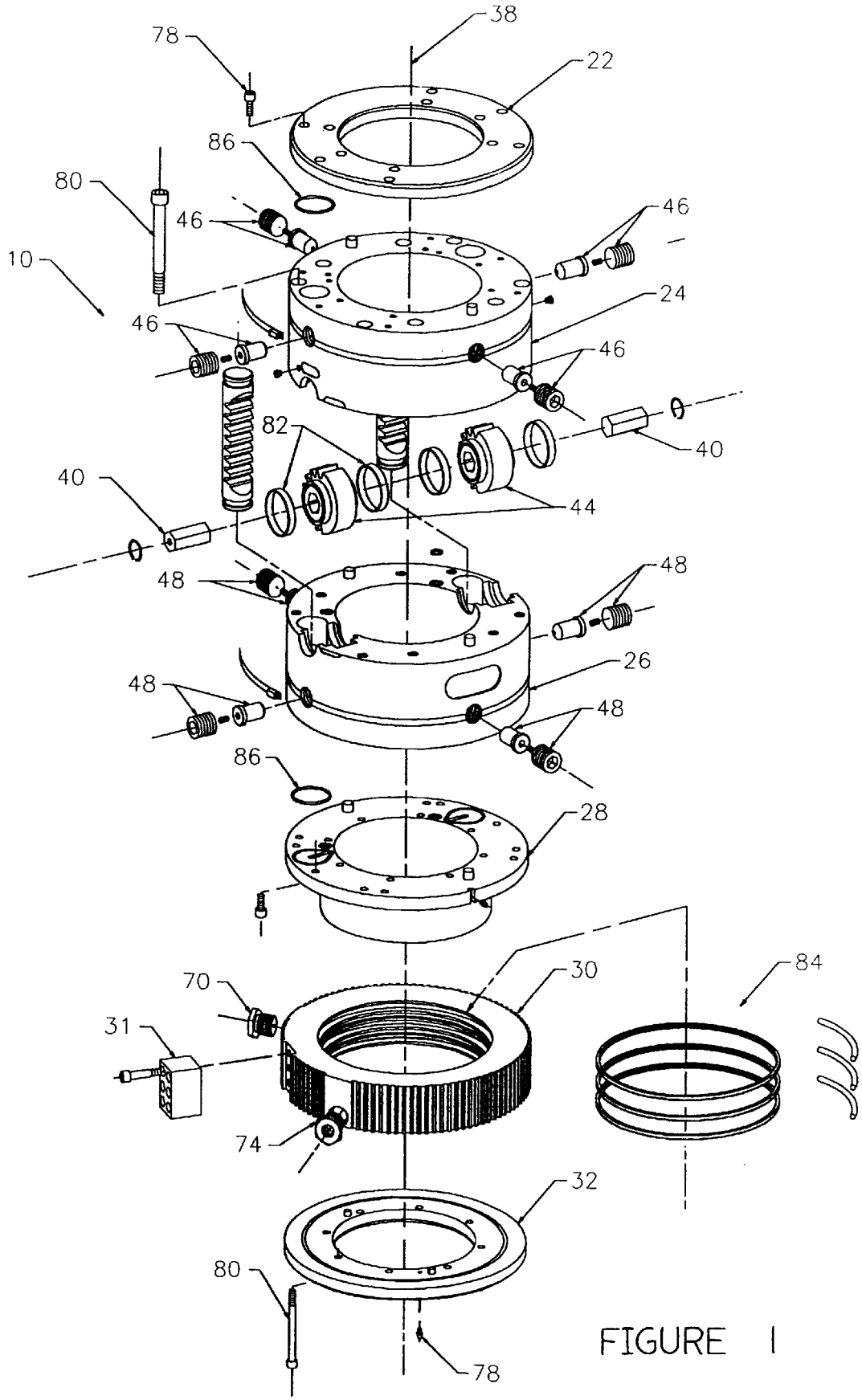
FIG. 1 is an exploded perspective view of a first embodiment of the present invention using two rack and pinion configuration.

The preferred embodiment, a rotary valve actuator generally identified by reference numeral 10, will now be described with reference to FIGS. 1 through 7. In this patent document, the term "hydraulic" refers to the use of a non-compressible fluid, as for example, a liquid such as oil, as opposed to the use of a gas, as an energy transfer medium.

Figure 2:
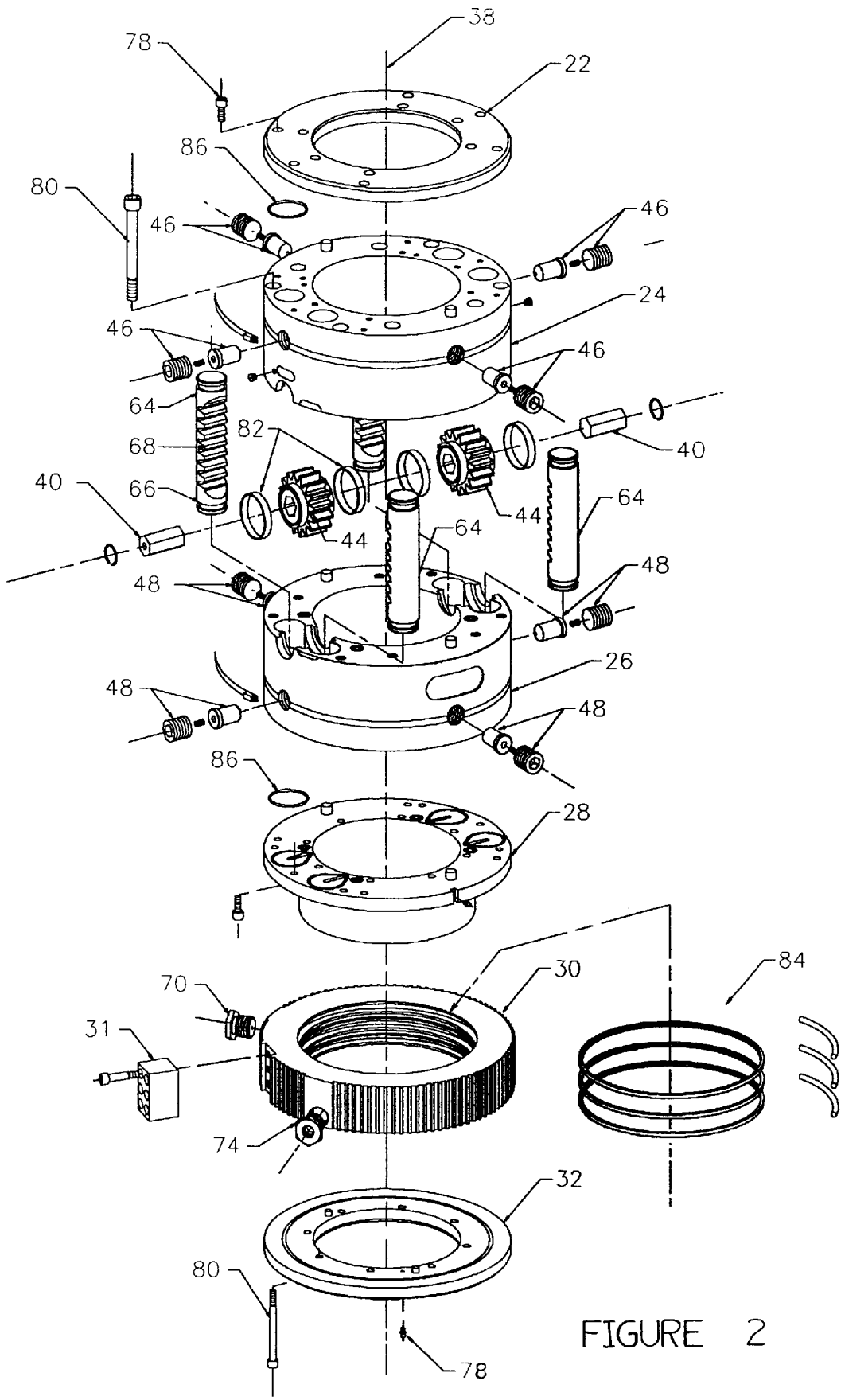
FIG. 2 is an exploded perspective view of a second embodiment of the present invention using a four rack and pinion configuration.
Figure 3:
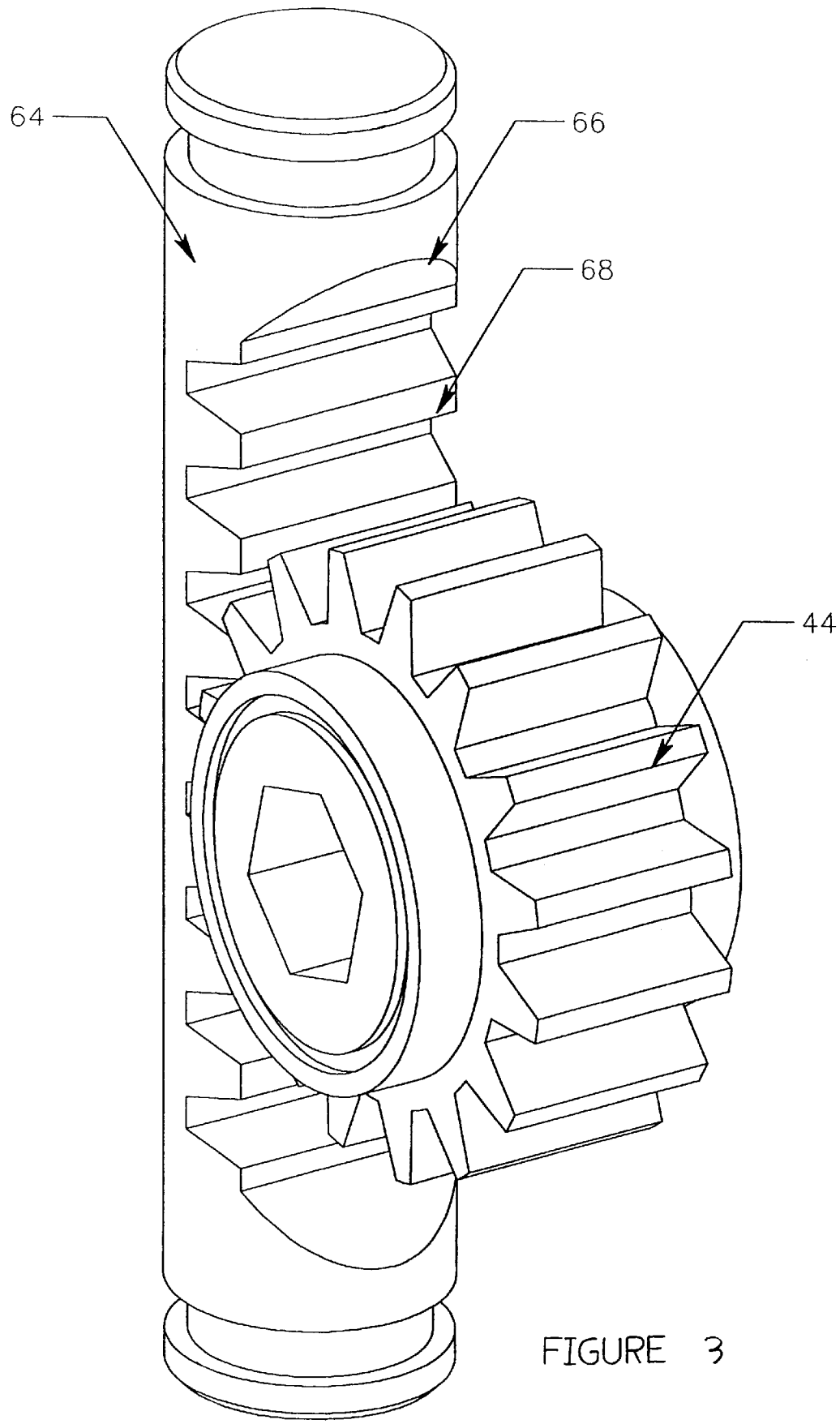
FIG. 3 is a perspective view of a third embodiment of the present invention using a single rack and pinion configuration.
Figure 4:
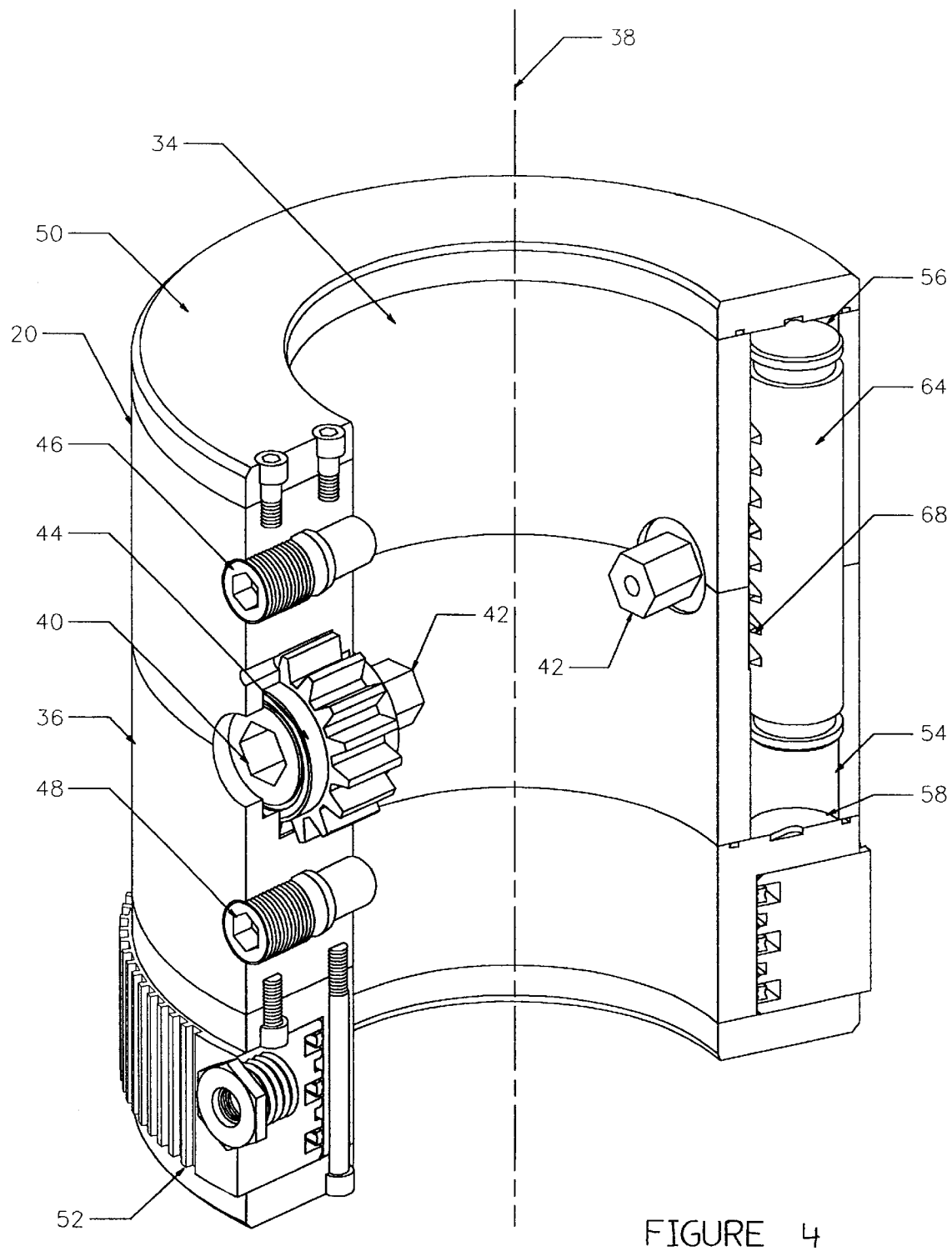
FIG. 4 is a perspective view in section of the first embodiment of the invention illustrated in FIG. 1.
Figure 5:
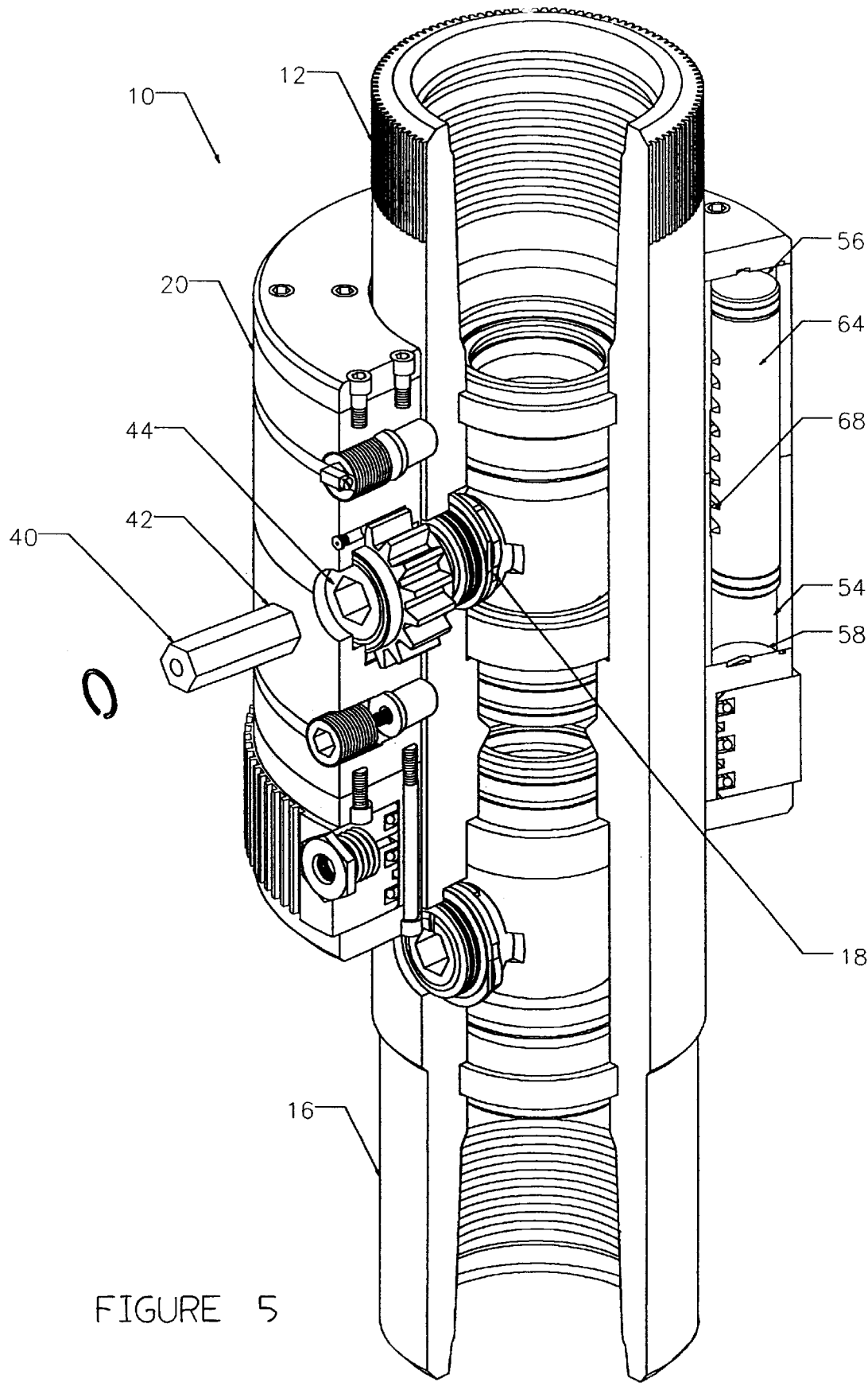
FIG. 5 is a perspective view in section of the first embodiment of the invention illustrated in FIG. 1, mounted on a tubular valve housing.
Figure 6:
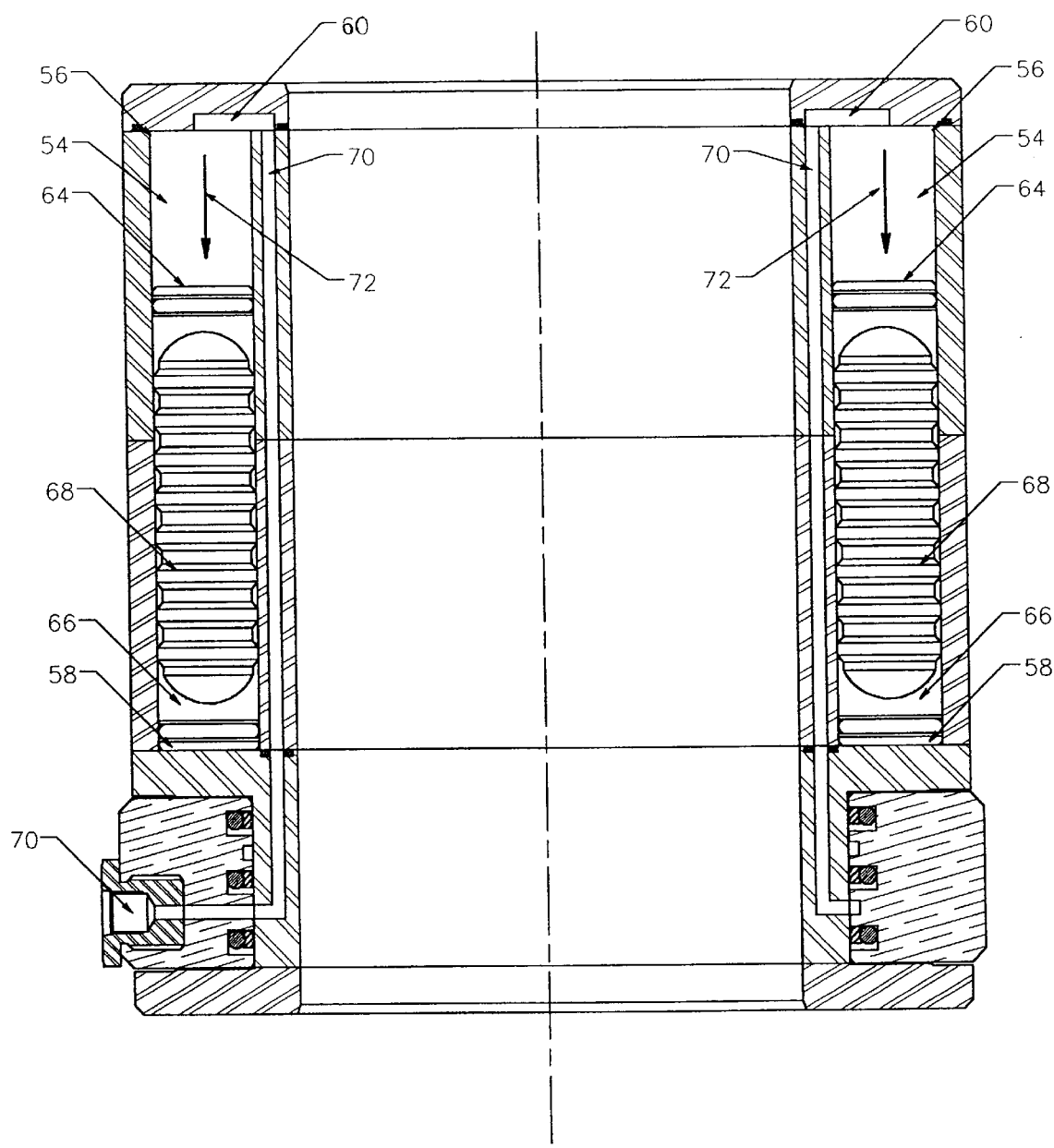
FIG. 6 is a first detailed side elevation view in section of the first embodiment of the present invention illustrated in FIG. 1.
Figure 7:
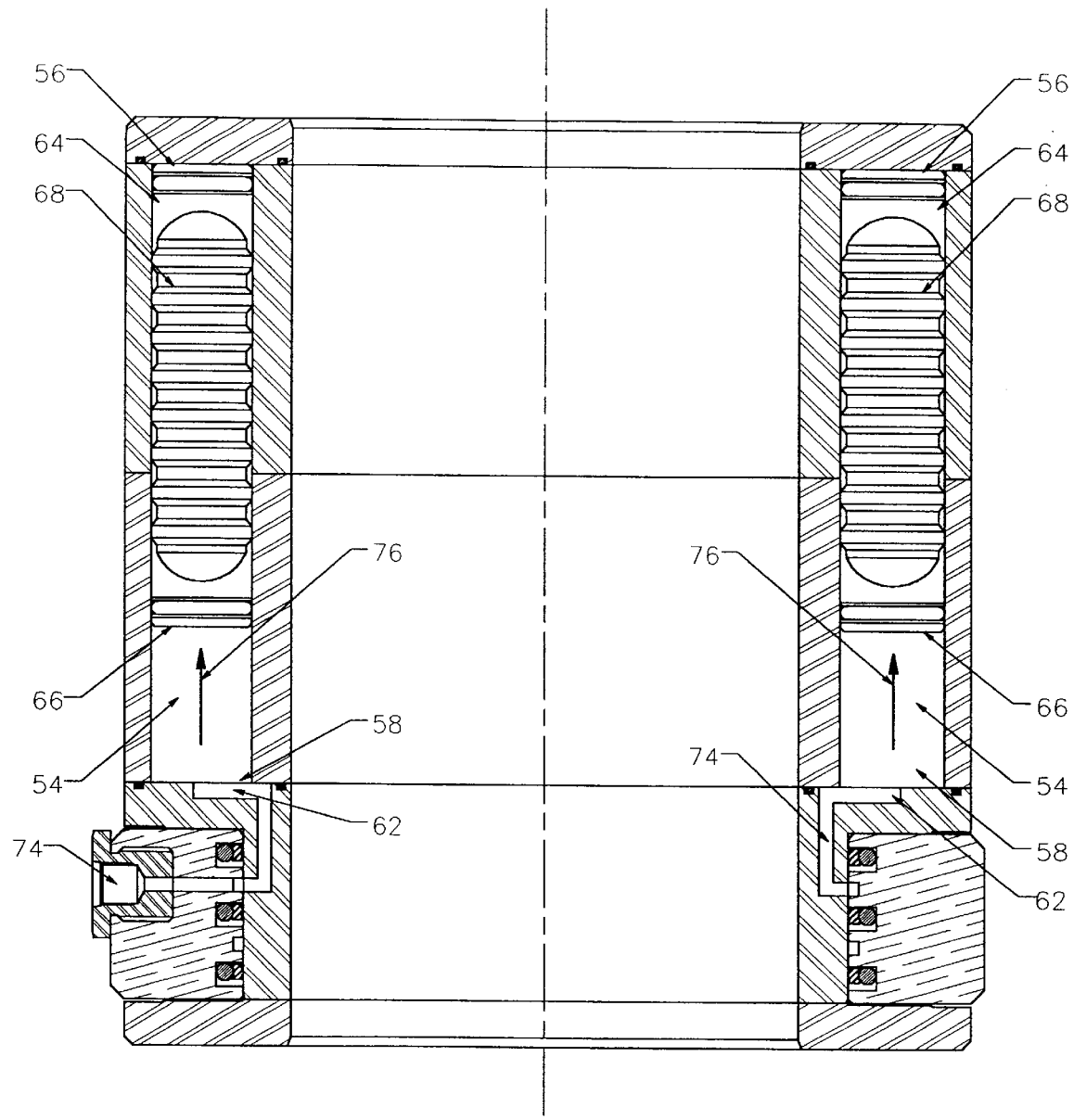
FIG. 7 is a first detailed side elevation view in section of the first embodiment of the present invention illustrated in FIG. 1.

Rotary valve actuator 10 is intended for actuating a valve that must be rotated between an open position and a closed position. Referring to FIG. 5, such a valve 12 is illustrated. Valve 12 has a tubular valve housing 14 having an exterior surface 16 with an actuating member receiving aperture 18. Referring to FIGS. 1 and 2, rotary valve actuator 10 includes a substantially annular body, generally identified by reference numeral 20. For ease of assembly, annular body 20 comes in a number of components, namely: upper end cap 22, upper cylinder housing 24, lower cylinder housing 26, flanged sleeve 28, hub 30 and lower end cap 32. Hub 30 is anchored in a stationary position by means of an anchor bracket 31, while the other components of annular body 20 are free to rotate. Referring to FIG. 4, when assembled as a unit, annular body 20 has an interior surface 34, an exterior surface 36 and a central axis 38. At least one male actuator member 40 is rotatably mounted within body 20. Male actuator member 40 has a valve coupling end 42 that projects perpendicularly from interior surface 34 of body 20. Referring to FIG. 5, valve coupling end 42 is inserted into actuating member receiving aperture 18 of tubular valve housing 14. A pinion gear 44 is positioned on male actuator member 40. Referring to FIGS. 1 and 2, annular body 20 is secured to exterior surface 16 of tubular valve housing 14 by means of a first set of four screw clamps 46 and a second set of four screw clamps 48. First set of four screw clamps 46 extend substantially perpendicularly from interior surface 34 of body 20 spaced from male actuator member 40 toward a first end 50 of body 20. They are equally spaced radially in an array around interior surface 34 of body 20. Second set of four screw clamps 48 extend substantially perpendicularly from interior surface 34 of body 20 and are spaced from male actuator member 40 toward a second end 52 of body 20. They are, similarly, equally spaced radially in an array around interior surface 34 of body 20. At least one hydraulic cylinder 54 is positioned parallel to central axis 38 of body 20. Cylinder 54 has a first end 56 and a second end 58. Referring to FIGS. 6 and 7, a first inlet 60 is positioned at first end 56 of cylinder 54. A second inlet 62 is positioned at second end 58 of cylinder 54. A fluid responsive piston 64 is positioned in each hydraulic cylinder 54. Piston 64 moves reciprocally between first end 56 and second end 58 of cylinder 54. Piston 64 has an exterior surface 66 with a rack tooth profile 68. It should be noted that the number of cylinders/pistons used can vary. FIG. 3 illustrates the manner in which rotary valve actuator 10 would operate with a single one of cylinder 54 and piston 64. FIG. 1 illustrates a preferred embodiment in which a pair of cylinders 54 with pistons 64 are provided. FIG. 2 illustrates an embodiment in which four cylinders 54 with pistons 64 are provided. The number of cylinders 54 and pistons 64 used will vary with the number of foot pounds of torque that the application demands. Of course, greater torque can be delivered to male actuator 40 if four cylinders 54 with pistons 64 are provided as illustrated in FIG. 2. Referring to FIG. 6, conduit 70 serves as means for supplying hydraulic fluid to first inlet 60, such that the flow of hydraulic fluid through first inlet 60 into hydraulic cylinder 54 causes fluid responsive piston 64 to move in a first direction, as indicated by arrows 72. Referring to FIG. 7, conduit 74 serves as means for supplying hydraulic fluid to second inlet 62, such that the flow of hydraulic fluid through second inlet 62 into the hydraulic cylinder 54 causes fluid responsive piston 64 to move in a second direction, as indicated by arrows 76. Referring to FIGS. 1 and 2, connection is made to conduits 70 and 74 at hub 30. As previously described, hub 30 is maintained in a stationary position by anchor bracket 31; if this were not the case problems would be encountered maintaining a connection between hydraulic lines and conduits 70 and 74. Referring to FIGS. 1 and 2, the various described components of annular body 20 are fastened together by means of screws 78 and bolts 80. Pinion gear 44 is supported for rotation by pinion bearings 82. A plurality of annular seals 84 are used contain hydraulic fluid within body 20. In addition, where components fasten together O ring seals 86 are used.

The use and operation of rotary valve actuator will now be described with reference to FIGS. 1 through 7. Referring to FIG. 3, pinion gear 44 on male actuator member 40 engages rack tooth profile 68 on exterior surface 66 of piston 64. Referring to FIGS. 6 and 7, piston 64 moves toward first end 56 or second end 58 of hydraulic cylinder 54 in response to hydraulic fluid flowing through conduit 70 and conduit 74, respectively. As piston 64 moves reciprocally between first end 56 and second end 58 of hydraulic cylinder 54, rack tooth profile 68 engages and causes rotational movement of pinion gear 44 thereby rotating male actuator member 40.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A rotary valve actuator for actuating a valve that must be rotated between an open position and a closed position, the valve being disposed in a tubular valve housing having an exterior surface with at least one actuating member receiving aperture, the rotary valve actuator comprising:

a substantially annular body having an interior surface, an exterior surface and a central axis;

at least one male actuator member rotatably mounted within the body, the male member having a valve coupling end that projects perpendicularly from the interior surface of the body, such that it can be inserted into the actuating member receiving aperture of the tubular valve housing;

means for securing the body to the exterior surface of the tubular valve housing including a first set of four screw clamps extending substantially perpendicularly from the interior surface of the body spaced from the at least one male actuator member toward a first end of the body, the first set of four screw clamps being in equispaced radial array around the interior surface of the body, and a second set of four screw clamps extending substantially perpendicularly from the interior surface of the body spaced from the at least one male actuator member toward a second end of the body, the second set of four screw clamps being in equispaced radial array around the interior surface of the body;

at least one hydraulic chamber positioned in the body having a first inlet and a second inlet;

a fluid responsive member positioned in the at least one hydraulic chamber between the first inlet and the second inlet;

means for supplying hydraulic fluid to the first inlet, such that the flow of hydraulic fluid through the first inlet into the at least one hydraulic chamber causes the fluid responsive member to move in a first direction;

means for supplying hydraulic fluid to the second inlet, such that the flow of hydraulic fluid through the second inlet into the at least one hydraulic chamber causes the fluid responsive member to move in a second direction; and means for translating movement of the fluid responsive member into rotary movement of the at least one male actuator member.

2. The rotary valve actuator as defined in claim 1, wherein the hydraulic chamber is a cylinder positioned parallel to the central axis of the body with the first inlet being positioned at a first end of the cylinder and the second inlet being positioned at a second end of the cylinder; the fluid responsive member being a piston that moves reciprocally between the first end and the second end of the cylinder.

3. The rotary valve actuator as defined in claim 2, wherein the means for translating movement of the fluid responsive piston into rotary movement of the at least one male actuator member includes a pinion gear positioned on the male actuator member that engages a rack tooth profile on an exterior surface of the piston, such that as the piston moves reciprocally between the first end and the second end of the at least one hydraulic cylinder the rack tooth profile engages and causes rotational movement of the pinion gear thereby rotating the at least one male actuator member.

4. A rotary valve actuator for actuating a valve that must be rotated between an open position and a closed position, the valve being disposed in a tubular valve housing having an exterior surface with at least one actuating member receiving aperture, the rotary valve actuator comprising:

a substantially annular body having an interior surface, an exterior surface and a central axis;

at least one male actuator member rotatably mounted within the body, the male member having a valve coupling end that projects perpendicularly from the interior surface of the body, such that it can be inserted into the actuating member receiving aperture of the tubular valve housing, a pinion gear being positioned on the male actuator member;

means for securing the body to the exterior surface of the tubular valve housing, including a first set of four screw clamps extending substantially perpendicularly from the interior surface of the body spaced from the at least one male actuator member toward a first end of the body, the first set of four screw clamps being in equispaced radial array around the interior surface of the body, and a second set of four screw clamps extending substantially perpendicularly from the interior surface of the body spaced from the at least one male actuator member toward a second end of the body, the second set of four screw clamps being in equispaced radial array around the interior surface of the body;

at least one hydraulic cylinder positioned parallel to the central axis of the body, the cylinder having a first end and a second end, a first inlet positioned at the first end of the cylinder and a second inlet positioned at the second end of the cylinder;

a fluid responsive piston positioned in the at least one hydraulic cylinder, the piston moving reciprocally between the first end and the second end of the cylinder, the piston having an exterior surface with a rack tooth profile;

means for supplying hydraulic fluid to the first inlet, such that the flow of hydraulic fluid through the first inlet into the at least one hydraulic cylinder causes the fluid responsive piston to move in a first direction;

means for supplying hydraulic fluid to the second inlet, such that the flow of hydraulic fluid through the second inlet into the at least one hydraulic cylinder causes the fluid responsive piston to move in a second direction; and the pinion gear on the male actuator member engages the rack tooth profile on an exterior surface of the piston, such that as the piston moves reciprocally between the first end and the second end of the at least one hydraulic cylinder the rack tooth profile engages and causes rotational movement of the pinion gear thereby rotating the at least one male actuator member.

* * * * *